United States Patent
Koval et al.

(10) Patent No.: US 8,343,324 B2
(45) Date of Patent: Jan. 1, 2013

(54) ELECTROCHEMICAL HIGH PRESSURE PUMP

(75) Inventors: Carl A. Koval, Arvada, CO (US); Christine E. Evans, Fayetteville, AR (US); Richard D. Noble, Boulder, CO (US); Mya A. Norman, Springdale, AR (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

(21) Appl. No.: 12/716,457

(22) Filed: Mar. 3, 2010

(65) Prior Publication Data

US 2010/0219067 A1 Sep. 2, 2010

Related U.S. Application Data

(63) Continuation of application No. 11/252,981, filed on Oct. 18, 2005, now Pat. No. 7,718,047.

(60) Provisional application No. 60/620,457, filed on Oct. 19, 2004.

(51) Int. Cl.
*B01D 61/42* (2006.01)
*B01D 69/00* (2006.01)

(52) U.S. Cl. ......................................... 204/518; 204/627
(58) Field of Classification Search .................. 204/518, 204/627; 417/48–50, 313; 137/13, 15.18, 137/803; 251/129.01–129.08
See application file for complete search history.

(56) References Cited

U.S. PATENT DOCUMENTS

| | | | | |
|---|---|---|---|---|
| 6,770,183 | B1 * | 8/2004 | Hencken et al. | 204/600 |
| 7,718,047 | B2 * | 5/2010 | Koval et al. | 204/518 |
| 8,187,441 | B2 * | 5/2012 | Evans et al. | 204/518 |
| 2004/0144646 | A1 * | 7/2004 | Theeuwes et al. | 204/450 |
| 2005/0252772 | A1 * | 11/2005 | Paul et al. | 204/450 |

* cited by examiner

*Primary Examiner* — J. Christopher Ball
(74) *Attorney, Agent, or Firm* — J. Charles Dougherty (57) ABSTRACT

The invention provides electrochemically-based methods and devices for producing fluid flow and/or changes in fluid pressure. In the methods and devices of the invention, current is passed through a divided electrochemical cell. Adjacent compartments of the cell are divided by a separator which comprises an ionically conducting separator. Each compartment includes an electrode and an electrolyte solution or ionic liquid. The electrolyte solution(s) or ionic liquid(s) and the ionically conducting separator are selected to obtain the desired relationship between the current through the cell and the fluid flowrate and/or change in fluid pressure.

42 Claims, 6 Drawing Sheets

ELECTROCHEMICAL HIGH PRESSURE PUMP

CROSS-REFERENCE TO RELATED APPLICATIONS

This application is a continuation of U.S. application Ser. No. 11/252,981, filed Oct. 18, 2005, which it turn claimed the benefit of U.S. Provisional Application No. 60/620,457, filed Oct. 19, 2004. Each of these prior applications are hereby incorporated by reference to the extent not inconsistent with the disclosure herein.

ACKNOWLEDGEMENT OF GOVERNMENT SUPPORT

This invention was made in part with support under U.S. Army Research Lab and Research Office Grant DAAD19-03-1-0053. The United States Government has certain rights in this invention.

BACKGROUND OF THE INVENTION

The invention is in the field of electrochemical pumping of fluids, including electrochemical pumps and methods for inducing pressurization and/or flow of fluids.

Pressurization and manipulation of fluids on the nano- and micro-scale are required for a wide range of microfluidics applications including analytical and synthetic "lab-on-a-chip", ultra-small particle handling, and micro/nano-spray systems. Identical demands are key for smart structures and morphing technologies that incorporate plant-like nastic structures and/or individually addressable cells (Chopra, I., Amer. Inst. Aeronautics Astronautics J. 2002, 40, 2145; Loewy, R. G., Smart. Mater. Struct. 1997, 6, R11). A variety of micropumps have been developed for these applications. One classification system identifies micropumps as either displacement pumps or dynamic pumps (Laser, D. J. and Santiago, J. G., 2004, J. Micromech. Microeng., 14, R35-R64). Displacement pumps exert pressure forces on the working fluid through one or more moving boundaries. Dynamic pumps continuously add energy to the working fluid in a manner that increases either its momentum or its pressure directly and include ultrasonic, magnetohydrodynamic (MHD), electrohydrodynamic (EHD), electroosmotic or electrochemical actuation mechanisms.

Electrokinetic pumps produce fluid flow through electroosmosis. In these pumps, a dielectric surface is placed in contact with an electrolyte and an electrically charged diffuse layer extends from the solid-liquid interface into the bulk of the electrolyte. The application of an electric potential to an electrolyte in contact with the dielectric surface produces a net force on the diffuse layer. U.S. Pat. No. 6,572,749, to Paul et al., describes an electrokinetic pump comprising at least one tube or channel forming a fluid passageway containing an electrolyte and having a porous dielectric medium disposed therein between one or more spaced electrodes. An electric potential is applied between the electrodes to cause the electrolyte to move in the microchannel by electro-osmotic flow. Silica particles having a diameter of about 100 nm to 6 microns are described as suitable for use as the porous dielectric medium. Ultra micro-porous material such as Vycor® porous glass or a Nafion® membrane was interposed between the electrode and the high pressure fluid junction. These ultra micro-porous materials are described as capable of carrying current but having pores sufficiently fine that pressure-driven or electro-osmotic flow is negligible.

The scientific literature describes micro-injectors and micro-dosing systems based on electrolytic gas generation. Lee et al. describe a micro injector actuated by bubbles generating by the boiling or electrolysis of an electrolyte in an actuator chamber (Lee, S. W. et al., 1998, Proc. 11$^{th}$ Annual Int. Workshop on Micro Electro Mechanical Systems, Heidelberg, Piscataway, N.J., IEEE). Bohm et al. describe a micromachined dosing system in which the driving force to dispense liquids originates from the electrochemical generation of gas bubbles by the electrolysis of water (Böhm, S. et al., 2000, J. Micromech. Microeng., 10, 498-504).

U.S. Pat. No. 4,118,299, to Maget, describes an electrochemical water desalination process relying on transport of protons and water through a cation exchange membrane. A salt-containing water stream is mixed with hydrogen and then pumped into an electrochemical cell whose anode and cathode are separated by a cation exchange membrane. The electrochemical cell ionizes hydrogen into protons which migrate to the counter electrode under the influence of an applied potential. The migrating protons entrain liquid water. At the counter-electrode, the migrating protons recombine to form hydrogen while releasing liquid water.

Redox batteries and fuel cells typically involve electrochemical cell compartments, each compartment containing one or more redox couples. The compartments are separated in some cases by an ion selective membrane. Several forms of redox flow cells or batteries have been developed. U.S. Pat. No. 3,996,064 to Thaller describes a two-compartment cell. During passage of current through the cell, an anode fluid is directed through the first compartment at the same time that a cathode fluid is directed through the second compartment. Chloride salts in aqueous solution are described as useful anode and cathode fluids. U.S. Pat. No. 4,786,567 to Skyllas-Kazacos et al. describes vanadium redox batteries which employ V(V)/V(IV) and V(III)/V(II) redox couples.

There remains a need in the art for additional devices and methods for producing fluid flow and/or pressurization using electrochemical means.

SUMMARY OF THE INVENTION

The invention provides electrochemically-based methods and devices for producing fluid flow and/or changes in fluid pressure. The electrochemical pumps of the invention produce changes in the pressure and/or volume of the electrolyte solution or ionic liquid associated with at least one compartment of an electrochemical cell. These pressure and/or volume changes can then be used to drive flow of the electrolyte solution or ionic liquid or flow of an entirely different fluid.

In the methods and devices of the invention, current is passed through a divided electrochemical cell. Adjacent compartments of the cell are divided by an ionically conducting separator. In an embodiment the ionically conducting separator comprises an ionically conducting membrane. Each compartment includes an electrode and an electrolyte solution or ionic liquid in contact with the electrode. The electrolyte solution(s) or ionic liquid(s) and the ionically conducting separator are selected to obtain the desired relationship between the current through the cell and the fluid flowrate and/or change in fluid pressure.

The devices of the invention can be sized to produce a variety of flow rates. In different embodiments, the flow rate is between about 1 nL/min to about 1 mL/min or between about 1 µL/min to about 1 mL/min. In an embodiment, only modest voltage/current conditions are required to produce flow. Some embodiments of the invention require no moving mechanical parts.

Forward and reverse pumping are readily available by changing the direction of the current through the electrochemical cell. Flexibility in changing the pumping direction allows repeat sampling and multi-pass processes. The ability to abruptly change the flow direction can aid in fluid mixing.

Each electrolyte solution or ionic liquid comprises a redox couple, i.e. soluble chemical species that can be either oxidized at the anode or reduced at the cathode. None of these species or the product produced by oxidation or reduction at the electrodes exists as a gas in the electrolyte. In the methods of the invention, the electrochemical cell is operated so that the dominant cell reactions are the reactions of the redox couples at the electrodes.

When a potential difference is applied between the cell electrodes, causing passage of electric current through the electrodes, ions and optionally solvent are transported across the separator. The separator may be ion-selective.

The electrochemical cell can be configured so that passage of current through the cell results in an increase in the pressure of the electrolyte solution or ionic liquid in at least one compartment of the electrochemical cell. Several mechanisms can lead to the increase in pressure in one compartment, including asymmetric solvent and/or ion transport through the separator, asymmetric changes in the density of the electrolyte solutions or ionic liquids caused by changes in apparent molar volume during the redox reaction, asymmetric changes in the density of the electrolyte solutions or ionic liquids caused by changes in apparent molar volume upon ion migration between compartments, and combinations thereof. The methods and devices of the invention are capable of producing a liquid pressure in one compartment of an electrochemical cell of 10 atmospheres or greater. The buildup of fluid pressure in the electrochemical cell compartment can drive flow or spraying of electrolyte solution or ionic liquid from that compartment or be transferred hydraulically to another compartment.

In an embodiment, the invention provides an electrochemical pump comprising an electrochemical cell comprising a first compartment comprising a first electrode and a first electrolyte solution, the first electrolyte solution comprising a first redox couple which participates in a first electrode reaction and a first group of ions different from the first redox couple species, wherein neither of the species of the first redox couple is a gas;

a second compartment comprising a second electrode and a second electrolyte solution, the second electrolyte solution comprising a second redox couple which participates in a second electrode reaction and a second set of ions different from the second redox couple species, wherein neither of the species of the second redox couple is a gas;

an ionically conducting separator separating the first and second compartment, the separator being in fluid communication with the first and second electrolyte solution; wherein the separator allows transport of at least some species of the first and second groups of ions but restricts transport of the ions of the first and second redox couples; and a source of electric current connected to the first and second electrode;

wherein the pump is configured so that when electric current is passed between the electrodes a pressure of greater than 10 atmospheres can be obtained in one compartment.

In another embodiment, the invention provides an electrochemical pump comprising an electrochemical cell comprising a first compartment comprising a first electrode and a first ionic liquid, the first ionic liquid comprising a first redox couple which participates in a first electrode reaction, wherein neither of the species of the first redox couple is a gas;

a second compartment comprising a second electrode and a second ionic liquid, the second ionic liquid comprising a second redox couple which participates in a second electrode reaction, wherein neither of the species of the second redox couple is a gas;

an ionically conducting separator separating the first and second compartment, the separator being in fluid communication with the first and second electrolyte solution; and a source of electric current connected to the first and second electrode wherein the pump is configured so that when electric current is passed between the electrodes a pressure of greater than 10 atmospheres can be obtained in one compartment.

In another embodiment, the electrochemical cell can be configured so that passage of current through the cell results in an increase in the volume of electrolyte solution or ionic liquid associated with at least one compartment of the cell. The same mechanisms that can lead to an increase in pressure can lead to an increase in volume of electrolyte solution or ionic liquid if the cell is configured to allow flow of fluid out of the compartment or if the compartment is not completely filled with electrolyte solution or ionic liquid.

Furthermore, the electrochemical cell can also be configured so that passage of current through the cell results in an increase in both the volume and pressure of the electrolyte solution or ionic liquid associated with at least one compartment of the electrochemical cell.

Changes in the pressure and/or volume of electrolyte solution or ionic liquid associated with one compartment of the electrochemical cell can be used to induce flow of an external fluid (a fluid other than the cell electrolytes or ionic liquids) in a flow channel external to the electrochemical cell. In one embodiment, changes in pressure and volume in one compartment of the cell can be used to drive movement of a flexible diaphragm which forms part of the cell compartment wall. The flexible diaphragm is in hydraulic communication with the fluid in a flow channel so that movement of the diaphragm induces movement of the external fluid in the flow channel.

In an embodiment, the invention provides an electrochemical apparatus for producing flow of a fluid in a flow channel comprising an electrochemical pump comprising a first compartment comprising a first electrode and a first electrolyte solution or ionic liquid, the first electrolyte solution or ionic liquid comprising a first redox couple, wherein neither of the species of the first redox couple is a gas;

a second compartment comprising a second electrode and a second electrolyte solution or ionic liquid, the second electrolyte solution or ionic liquid comprising a second redox couple, wherein neither of the species of the second redox couple is a gas, wherein at least one of the first and second compartments further comprises a flexible diaphragm;

an ionically conducting separator separating the first and second compartments, the separator being in fluid communication with the first and second electrolyte solutions;

a source of electric current connected to the first and second electrode; and at least one flow channel containing a fluid; wherein the flow channel is positioned so that the flexible diaphragm is in contact with the fluid in the flow channel wherein the pump is configured such that when current is passed between the electrodes the pressure in and volume of the electrolyte solution or ionic liquid in the compartment having the flexible diaphragm changes, thereby causing movement of the flexible diaphragm and flow of the fluid in the flow channel.

In another embodiment, increases in fluid volume and/or pressure associated with one compartment of the cell cause outward flow of electrolyte solution or ionic liquid through an outlet in that compartment. Outward flow of electrolyte solution or ionic liquid can be used to drive flow of an external fluid in the flow channel away from the compartment. The outlet is in fluid communication with the flow channel containing the external fluid. The ionic solution or liquid may be in direct contact with the external liquid in the flow channel or may be separated from the liquid by a hydraulic force transmission element. In an embodiment, the hydraulic force transmission element is located within the flow channel and movement of the hydraulic force transmission element in the flow channel induces flow of the fluid. The hydraulic force transmission element may be gas, liquid, or solid. Similarly, decreases in fluid volume and/or pressure associated with one compartment of the cell can be used to drive flow of an external fluid in a flow channel towards the compartment.

In an embodiment, the invention provides an electrochemical apparatus for producing flow of a fluid in a flow channel comprising an electrochemical pump comprising a first compartment comprising a first electrode and a first electrolyte solution or ionic liquid, the first electrolyte solution or ionic liquid comprising a first redox couple, wherein neither of the species of the first redox couple is a gas;

a second compartment comprising a second electrode and a second electrolyte solution or ionic liquid, the second electrolyte solution or ionic liquid comprising a second redox couple, wherein neither of the species of the second redox couple is a gas, wherein one of the first and second compartments further comprises an outlet;

an ionically conducting separator separating the first and second compartments, the separator being in fluid communication with the first and second electrolyte solution;

a source of electric current connected to the first and second electrodes;

at least one flow channel containing a fluid, the flow channel being in fluid communication with the compartment outlet; and a hydraulic force transmission element located within the flow channel between the fluid and the electrolyte solution or ionic liquid from the compartment with the outlet wherein the pump is configured such that when current is passed between the electrodes the volume of the electrolyte solution or ionic liquid associated with the compartment having the outlet changes, thereby causing flow of electrolyte solution or ionic liquid into or out of the outlet, movement of the hydraulic force transmission element and flow of the fluid in the flow channel.

In addition, increases in the pressure and volume of electrolyte solution or ionic liquid associated with one compartment of the electrochemical cell can be used to pressurize a fluid external to the electrochemical cell. In an embodiment, the external fluid is in a closed compartment and a hydraulic force transmission element is located in between the electrolyte solution or ionic liquid and the external fluid.

Furthermore, changes in the pressure and/or volume of electrolyte solution or ionic liquid associated with one compartment of the electrochemical cell can be used to induce movement of a solid body external to the electrochemical cell. In one embodiment, changes in pressure and volume in one compartment of the cell can be used to drive movement of a flexible diaphragm which forms part of the cell compartment wall. The flexible diaphragm is connected to the solid body so that movement of the diaphragm causes movement of the solid body. The solid body may act as a hydraulic force transmission element which in turn transfers force to a fluid external to the electrochemical cell.

The invention also provides methods for converting an electric current or potential to changes in liquid pressure. In an embodiment, the invention provides a method for converting an electric current to a change in liquid pressure of an electrolyte solution or ionic liquid, the method comprising the steps of:

providing a divided electrochemical cell comprising a plurality of compartments, each pair of adjacent compartments being divided by an ionically conducting separator, each compartment comprising an electrode and an electrolyte solution or ionic liquid, each electrolyte solution or ionic liquid comprising a redox couple, wherein neither of the species of each redox couple is a gas and the cell configuration is selected so that passage of an electric current between the electrodes produces a change in the pressure of the electrolyte solution or ionic liquid in at least one cell compartment; and passing an electric current between the cell electrodes for sufficient time that the change in fluid pressure is greater than about 1 atmosphere.

The invention also provides methods for producing flow of a fluid in a flow channel. In an embodiment, the invention provides a method for producing flow of a fluid in a flow channel, the method comprising the steps of:

providing a divided electrochemical cell comprising a plurality of compartments, each pair of adjacent compartments being divided by an ionically conducting separator, each compartment comprising an electrode and an electrolyte solution or ionic liquid and at least one compartment further comprising an outlet, each electrolyte solution or ionic liquid comprising a redox couple, wherein neither of the species of each redox couple is a gas and the cell configuration is selected so that passage of an electric current between the electrodes produces a change in the volume of the electrolyte solution or ionic liquid associated with the compartment having an outlet;

providing a flow channel containing a fluid, the flow channel being in fluid communication with the outlet of the cell compartment; and passing an electric current between the cell electrodes, thereby causing flow of the electrolyte solution or ionic liquid through the outlet of the cell compartment and flow of the fluid in the flow channel.

In another embodiment, the invention provides a method of producing flow of a fluid in a flow channel comprising the steps of:

providing a divided electrochemical cell comprising a plurality of compartments, each pair of adjacent compartments being divided by an ionically conducting separator, each compartment comprising an electrode and an electrolyte solution or ionic liquid and at least one compartment further comprising a flexible diaphragm, each electrolyte solution or ionic liquid comprising a redox couple, wherein neither of the species of each redox couple is a gas and the cell configuration is selected so that passage of an electric current between the electrodes produces a change in the pressure and volume of the electrolyte solution or ionic liquid in the cell compartment with the flexible diaphragm;

providing a flow channel containing a fluid, the fluid in the flow channel being in contact with the flexible diaphragm; and passing an electric current between the electrodes, thereby producing movement of the flexible diaphragm and flow of the fluid in the flow channel.

DETAILED DESCRIPTION OF THE INVENTION

The methods and pumps of the invention employ at least one divided electrochemical cell. As referred to herein, an electrochemical cell comprises a container containing two or more electrically conducting phases, each pair of electrically conducting phases being connected by an ionically conducting phase. In a divided cell, the container is divided into two or more compartments, each containing an ionically conducting phase. In an embodiment, the electrochemical cell comprises a cell container divided into a first and a second compartment by an ionically conducting separator. In another embodiment, the electrochemical cell may comprise more than two compartments, with each pair of adjacent compartments divided by an ionically conducting separator. The cell container may be of any suitable configuration or material known to the art to achieve the desired electrochemical configuration and activity of the cell. The cell container may be completely rigid, partially flexible, or wholly flexible. The flexibility of the cell container is selected depending on the desired mode of operation of the cell. For example, pressure can build up more rapidly in one compartment of the cell if that compartment is rigid. In another embodiment, one or more compartments are flexible, allowing expansion of the compartment.

A source of electric current or electrical potential is connected between the electrically conducting phases of the cell. Sources of electric current and electrical potential, such as current and power supplies, are known to those skilled in the art.

As used herein, the configuration of an electrochemical cell includes the physical arrangement of the cell, the particular electrolyte solution(s) or ionic liquid(s), and the particular ionically conducting separator(s). The physical arrangement of the cell includes the number of cell compartments and whether individual cell compartments contain outlets or other features such as flexible diaphragms. The configuration of the electrochemical pump includes the electrochemical cell configuration, as well as the particular electric current or voltage source selected.

In an embodiment, the electrochemical cell can be adapted or configured so that the transfer of ions and optionally solvent across the separator results in a change in the pressure in the electrolyte solution or ionic liquid in at least one of the cell compartments. In different embodiments, the pressure in the cell is greater than about 1 atmosphere, between about 1 atmosphere and about 10 atmospheres, greater than about 10 atmospheres or greater than about 20 atmospheres.

Figure 1:
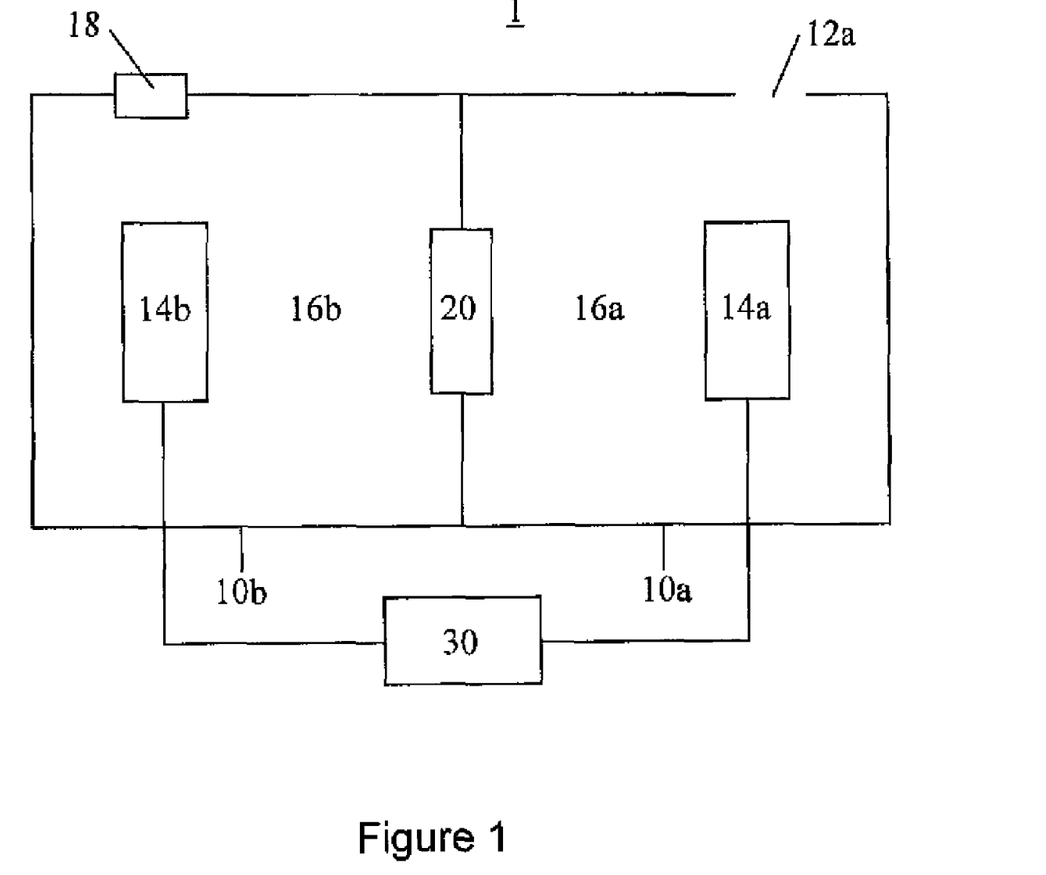
FIG. 1: Schematic showing an electrochemical pump which produces an increase in pressure in one compartment of the electrochemical cell.

FIG. 1 schematically illustrates a divided electrochemical cell 1 having two compartments 10a and 10b, which is configured to allow pressurization of compartment 10b. Compartments 10a and 10b are separated by ionically conducting separator 20. Compartment 10a is open to the atmosphere through outlet 12a and contains electrode 14a and electrolyte solution or ionic liquid 16a. Compartment 10b is closed, fitted with a pressure transducer 18 and contains electrode 14b and electrolyte solution or ionic liquid 16b. The two electrodes 14a and 14b are connected through current source 30. The circuit is completed by ionic conduction through liquids 16a and 16b and ionically conducting separator 20. Flow of electrons from electrode 14a to electrode 14b is accompanied by a corresponding flow of positive ions from compartment 10a to compartment 10b. If liquid 16a is an electrolyte solution, there may also be a flow of solvent from compartment 10a to compartment 10b. Electrolyte solutions or ionic liquids 16a and 16b are selected so that transfer of positive ions (and optionally solvent) from compartment 10a to compartment 10b results in an increase in the fluid pressure in compartment 10b.

The change in the fluid pressure in compartment 10b will depend upon the pressure change associated with the redox reaction in this compartment, as well as the pressure changes associated with ion and solvent transfer across the separator. If the pressure change associated with the redox reaction itself is small, the overall pressure change associated with the cell reaction will be dominated by ion and solvent transfer across the separator. In an embodiment, at least one ion species having a large apparent molar volume is transported across the separator from compartment 10a to compartment 10b.

Figure 2:
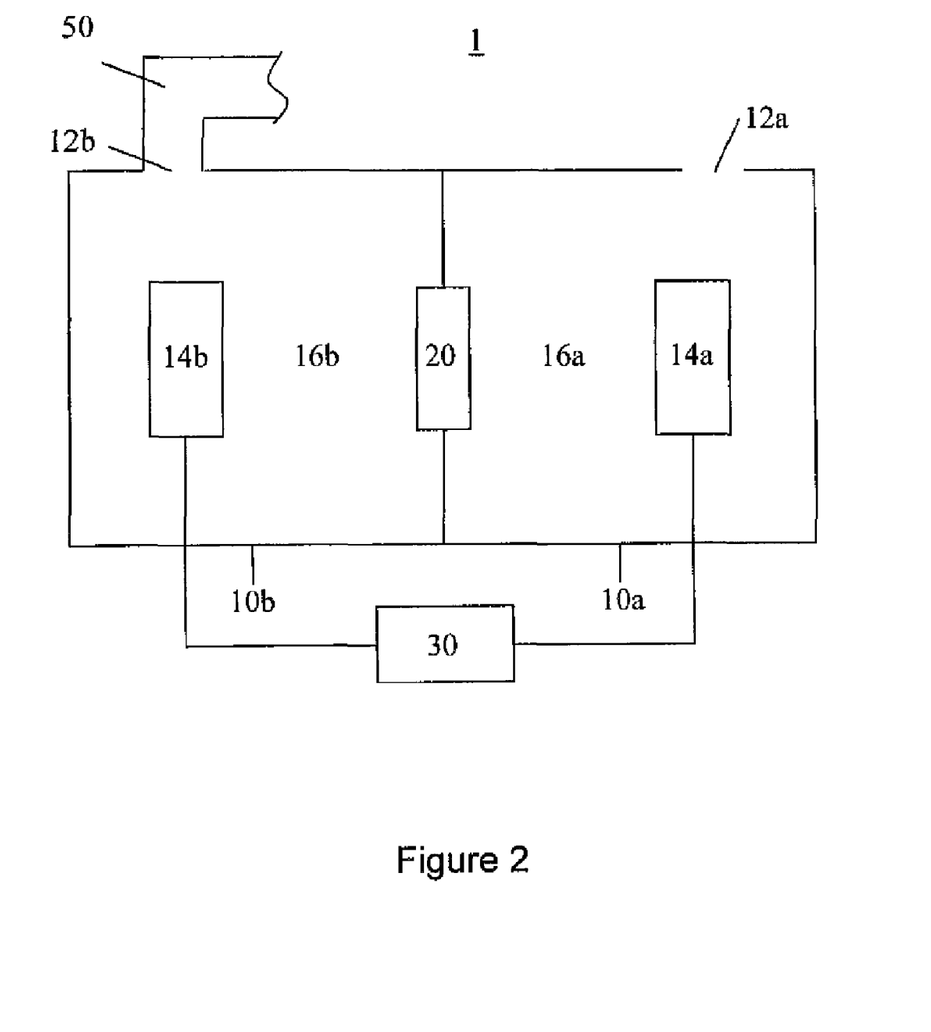
FIG. 2: Schematic showing an electrochemical pump which produces electrolyte solution or ionic liquid flow out of one compartment of an electrochemical cell.

In another embodiment, the electrochemical cell is configured so that the transfer of ions and optionally solvent across the separator results in an increase in the volume of electrolyte solution or ionic liquid on one side of the separator and associated with one of the cell compartments. An increase in volume of electrolyte solution or ionic liquid causes flow of electrolyte solution or ionic liquid out of the compartment if the cell compartment is filled with electrolyte solution or ionic liquid and the volume of the cell compartment is fixed. FIG. 2 schematically illustrates a divided electrochemical cell 1 having two compartments 10a and 10b, which is configured to allow fluid flow in or out of compartment 10b. Compartments 10a and 10b are separated by ion-conducting separator 20. Compartment 10a is open to the atmosphere through outlet 12a and contains electrode 14a and electrolyte solution or ionic liquid 16a. Compartment 10b is connected to a flow channel 50 through outlet 12b and contains electrode 14b and electrolyte solution or ionic liquid 16b. The two electrodes 14a and 14b are connected through current source 30. The circuit is completed by ionic conduction through liquids 16a and 16b and ionically conducting separator 20. Electrolyte solutions or ionic liquids 16a and 16b are selected so that transfer of positive ions (and optionally solvent) from compartment 10a to compartment 10b results in an increase in the electrolyte solution or ionic liquid volume associated with compartment 10b, which in turn leads to flow of electrolyte solution or ionic liquid out outlet 12b.

The volume change associated with compartment 10b will depend upon the apparent molar volume change associated with the redox reaction, as well as the apparent molar volume change due to ion and solvent transfer across the separator.

The volume of electrolyte solution or ionic liquid is referred to as the volume associated with the cell compartment rather than the volume in the cell compartment because the volume of electrolyte solution or ionic liquid associated with a compartment can be greater than the compartment volume and therefore may not be confined to that compartment. For example, if that compartment is filled with fluid, the change in volume may manifest itself as an outward flow of fluid from that compartment. If the apparent molar volume change associated with the redox reaction itself is small, the overall volume change associated with the cell reaction will be dominated by ion transfer and optionally solvent transfer across the separator.

The present invention can also be used to drive flow of a fluid in an external flow channel, the fluid being other than the electrolyte solution or the ionic liquid in the compartment driving the flow. In another embodiment, the cell compartment further comprises a flexible diaphragm and the cell compartment is filled with electrolyte solution or ionic liquid. In an embodiment, the flexible diaphragm is impermeable to the ionic solution or liquid. In another embodiment, the diaphragm is semipermeable to the ionic solution or liquid. When the flexible diaphragm contacts fluid in a flow channel external to the electrochemical cell, the increase in fluid volume and pressure associated with the compartment causes deformation of the diaphragm, which in turn can be used to induce flow of fluid in a flow channel external to the electrochemical cell. The flow channel may or may not be directly connected to the electrochemical cell. Any suitable material known to the art may be used for the diaphragm, including polymeric materials and sufficiently thin sections of non-polymeric materials such as silicon, glass and metal. The diaphragm material is selected to be chemically compatible with the ionic solution or liquid as well as the fluid in the flow channel.

An electrochemical pump having a flexible diaphragm can be used as a reciprocating displacement micropump. Reciprocating displacement micropumps in which the force-moving moving surface is a deformable plate are known to the art. Several such pumps are described by Laser and Santiago (Laser, J. and Santiago, J. G., 2004, J. Micromech. Microeng., 14, R35-R64) Typically, a reciprocating displacement micropump comprises a pump chamber bounded on one side by the pump diaphragm, an actuator mechanism or driver and two passive check valves-one at the inlet (or suction side) and one at the outlet (or discharge side).

In another embodiment, the flow channel is in fluid communication with an outlet in one of the compartments of the electrochemical cell. As shown schematically in FIG. 2, the flow channel may be connected directly to the compartment wall. A hydraulic force transmission element may be present in the flow channel, located between the electrolyte solution or ionic liquid from the cell compartment and the fluid to be pumped in the flow channel. The hydraulic force transmission element is used to separate the electrolyte solution or ionic liquid from the fluid to be pumped and also to transfer hydraulic force from the electrolyte solution or ionic liquid to the fluid be pumped. In an embodiment, the hydraulic force transmission element may be a gas, such as a bubble. In another embodiment, the hydraulic force transmission element may be a liquid. The liquid acting as the hydraulic force transmission element may be selected so that mixing is limited between the hydraulic force transmission liquid and both the fluid to be pumped in the flow channel and the electrolyte solution or ionic liquid. In an embodiment, the liquid hydraulic force transmission element is selected so that it is immiscible with and does not react with the fluid(s) to be moved through the device. The liquid hydraulic force transmission element is also preferably selected so that it wets the flow channel with equal or greater wettability than the fluid(s) to be moved through the device. These miscibility and wetting conditions allow formation of a "slug" of liquid between the electrolyte solution or ionic liquid and the fluid in the flow channel. The viscosity of the liquid hydraulic force transmission element is preferably selected so that its resistance to flow can be overcome by the flow of electrolyte solution or ionic liquid from the electrochemical cell. In another embodiment, the hydraulic force transmission element is a solid.

If the cell is configured so that the flow rate of electrolyte solution or ionic liquid out of the compartment is equal to the transfer of ions and optionally solvent into the compartment across the separator, the flow rate of electrolyte solution or ionic liquid out of the compartment will be constant if the net transfer of ions and optionally solvent into the compartment across the separator is constant.

In another embodiment, the electrochemical cell is adapted or configured so that the transfer of ions and optionally solvent across the separator results in both an increase in the pressure in the electrolyte solution or ionic liquid in one of the cell compartments and an increase in the fluid volume associated with that compartment. If the compartment is filled with electrolyte solution or ionic liquid, the pressure in the compartment increases if the mechanisms leading to an increase in pressure are not counterbalanced by flow of electrolyte solution or ionic liquid out of the compartment or by some other mechanism (e.g. expansion of the compartment). In an embodiment, the cell compartment is filled with electrolyte solution or ionic liquid and the volume of the cell compartment is fixed. The increase in fluid volume associated with the compartment causes flow of electrolyte or ionic liquid out of the compartment. Flow through the outlet is sufficiently restricted that the pressure in the cell compartment increases. The pressure change in the compartment will depend on the flow rate of electrolyte solution or ionic liquid out of the cell, as well as the pressure changes associated with the redox reaction and ion and solvent transfer across the separator.

The current through the electrochemical cell depends on the magnitude and polarity of the applied potential. In an embodiment, the current density is between about 2 and about 100 $mA/cm^2$, where the current density is based on the separator cross-sectional area. Preferably, the cell current is less than the mass-transport limited current associated with oxidation or reduction of the redox couple. These current densities can be achieved with applied potentials less than about 10 V. In an embodiment, the applied potential is less than about 1 V.

As used herein, an electrolyte solution is a solution containing an electrolyte. Electrolytes include ionic liquids and chemical compounds that dissociate into electrically charged ions when dissolved in a solvent. The solvent is selected so that the electrolyte is soluble and stable in the chosen solvent. The electrolyte solution in adjacent compartments of the cell may be the same or different. In an embodiment, each compartment of the electrochemical cell contains an electrolyte solution, with the solvent being the same in each compartment. The solvent and redox concentrations may be the same in each compartment, or may be different. In another embodiment, each compartment contains the same ionic liquid. In an embodiment, at least one compartment contains an electrolyte solution and at least one compartment contains an ionic liquid.

In the present invention, the electrolyte solution or ionic liquid present in each compartment comprises a redox couple.

As used herein, a redox couple is a pair of chemical species linked by a given half reaction (either oxidation or reduction) at an electrode. The redox species may or may not be transported across the separator. In addition, some of the redox species may be transported while others are not. The electrolyte or ionic liquid may consist essentially of the redox couple or may comprise additional ionic species. The redox couple in adjacent compartments may be the same or different.

An "active" redox couple is selected so that under the conditions of operation of the cell the predominant electrode reaction is either oxidation or reduction of the active redox couple. Determination of whether a particular redox couple will be active under given cell operation conditions is known to those skilled in the art. The electrolyte solution or ionic liquid may further comprise an additive chelating agent or complexing agent to shift the standard electrode potential of the redox reaction. The redox couple may be inorganic, organometallic, or organic. Inorganic redox couples include, but are not limited to (iodide/iodine). Organometallic redox couples include, but are not limited to (ferricyanide/ferrocyanide). Organic redox couples include, but are not limited to (quinone/hydroquinone). In an embodiment, both redox species are ions. In another embodiment, both redox species are anions. In another embodiment, at least one of the redox species is neutral.

The redox couple is selected so that neither of the species in a particular redox couple is gaseous under the cell operating conditions. In an embodiment, the current efficiency for any electrode reaction that produces a gas is less than about one percent.

Each electrolyte solution or ionic liquid present in a compartment may further comprise an additive which provides additional ions which are different from the redox couple species in that compartment. In an embodiment, at least some of these additional ions are transported across the ionically conducting separator. Such an additive may be used when the redox couple species are not transported across the separator, but may also be used when the redox couple species are transported across the separator. Useful additive ion species include, but are not limited to, alkylammonium ions, including tetraalkylammonium ions such as tetrapropylammonium ($TPA^+$) and tetrabutylammonium ($TBA^+$), alkali metal ions such as $Li^+$, $Na^+$, $K^+$, and $TRISH^+$ (tris(hydroxymethyl)aminomethane$H^+$). In an embodiment, one or more of the ion species listed above is used in combination with a sulfonated perfluoropolyethylene cation exchange membrane such as Nafion®.

The redox couples and optional electrolyte or ionic liquid additives are selected in combination with the ionically conducting separator to obtain the desired relationship between the current through the electrochemical cell and the flowrate and/or change in fluid pressure. The overall change in fluid volume or pressure in a cell compartment depends on the combined effect of the volume change associated with the overall chemical change occurring in the compartment (the overall chemical change being a combination of the redox reaction and ion migration) and, if applicable, the volume change associated with solvent migration.

The redox reaction may be selected to provide a small change in apparent molar volume. For example, for the redox reaction $I_3^- + 2 e^- \rightarrow 3 I^-$, the apparent molar volume of $I_3^-$ has been shown to be close to that of $3 I^-$ in some solutions (Norman et al., 2004, J. Electrochem. Soc., 151(12), E364-D371; Norman et al., 2005, Anal. Chem., 77(10), 6374-6380). In one embodiment, when an increase in fluid pressure or volume is to be obtained in a particular cell compartment, the redox reaction in that compartment is selected so that it does not produce an apparent molar volume decrease upon reduction.

The species being transported across the separator may also be selected to have a relatively large apparent molar volume. The ion species is selected to be small enough to allow sufficient transport of the ion species across the separator. In an embodiment, the apparent molar volume of at least one ion species being transported across the separator is at least about 10 $cm^3$/mol. In other embodiments, the apparent molar volume is at least about 25 $cm^3$/mol, at least about 50 $cm^3$/mol, or at least about 100 $cm^3$/mol.

Suitable electrolyte solvents for use with the present invention are those which allow solvation of the selected redox couples and electrolyte additives. In an embodiment, the solvents allow the concentration of the redox couple or electrolyte additive in solution to be greater than about 0.1 mol/L. These electrolyte solvents include, but are not limited to, water, dimethylformamide (DMF), aqueous organic ether mixtures, aqueous acetonitrile, ionic liquids and task specific ionic liquids for which the redox couple is part of the ionic liquid.

As used herein, an ionic liquid is a liquid consisting only of anions and cations. Suitable ionic liquids for use with the present invention include, but are not limited to room temperature ionic liquids, such as 1-butyl-3-methylimidizolium tetrafluoroborate.

In an embodiment, the open circuit voltage of the electrochemical cell is zero. As used herein, the open circuit voltage of the electrochemical cell is the voltage of the cell under zero current conditions. An open circuit voltage of zero can be achieved by using the same electrolyte solution or ionic liquid in all compartments of the cell. In another embodiment, the open circuit voltage of the electrochemical cell is nonzero.

An inert electrode is used that does not take part in any reactions under the conditions of the oxidation/reduction of the redox forms. Suitable electrodes for the practice of the invention include graphite and inert metals such as platinum. In an embodiment, the electrodes are in a form which provides a high surface area. An electrode may also take part in the redox reaction, for example Ag/AgCl. The electrode material in adjacent cell compartments may be the same or may be different.

The electrochemical cell compartments are separated by an ionically conducting separator. At least a portion of the ionically conducting separator is ionically conducting. The ionically conducting portion of the separator can be a solid or a liquid. In an embodiment, the ionically conducting portion of the separator is a membrane. In an embodiment, membranes suitable for use with the present invention form an integral layer and so do not include non-cohesive packed particles. For applications in which development of significant pressures (greater than about 1 bar) is desirable, membranes with relatively low hydraulic permeability are used. Useful membranes with sufficiently low hydraulic permeability can have pores less than about 100 nm in diameter. Suitable ionically conducting membrane materials are well known in the art and include hydrocarbon ion exchange membranes, Nafion® (a sulfonated perfluoropolyethylene sold by DuPont) and other fluorocarbon ion exchange membranes. In an embodiment, the ionically conducting membrane is an ion exchange membrane. Ion exchange membranes may be homogeneous or heterogeneous. In an embodiment, the ionically conducting membrane is a heterogeneous ion exchange resin pressed into a flexible backing, such as Ionac® (Sybron Chemicals, Inc.) and Ultrex™ (Membranes International, Inc.). In an embodiment, the membrane is a cation exchange membrane. Ionically conducting glasses are also suitable for the practice of the invention. In an embodiment, the membrane is selected to allow asymmetric solvent transport or an asymmetric change in the density of the electrolyte solutions or ionic liquids when current passes through the cell. Preferably, the membrane is sufficiently chemically compatible with the ionic solution(s) or liquid(s) that any degradation of the membrane by the fluids does not substantially affect transport through the membrane during the time period of interest.

The ionically conducting separator is selected to allow a sufficient electrically-driven flux of the desired ion species through the separator. The separator may be permselective, so that the flux of different ion species through the separator differs. In one embodiment where ions different from the redox species are added to the electrolyte, the separator may be used to allow transport of at least some of the non-redox ion species but restrict transport of the redox species. In an embodiment, the flux of the redox species is restricted to be less than about 1%. Use of an ion exchange membrane allows selection of the sign of the charge of the ions which will be transported across the membrane. For example, the cell may comprise electrolyte solutions with anionic redox couples and electrolyte additives which provide cations having a relatively large apparent molar volume. If a cation exchange membrane is used in the cell, the cations are the ions which will be transported across the membrane.

When it is desired to transport solvent across the ion permeable separator, the separator is selected to have a sufficiently high transference coefficient to produce the desired solvent flow rate across the separator. In different embodiments, the transference coefficient is at least about 3.5, at least about 4, or at least about 5.0. For at least some ion exchange membranes, the transference coefficient of a membrane for a particular ion/solvent combination correlates with the degree of solvent swelling of the membrane when the ions are present in the membrane. Okada et al. have shown that for Nafion® membranes, alkali metal ions which attract more water molecules in the membrane, which was reflected as increased solvent swelling, transported more solvent molecules (Okada, T. et al., 2002, J. Phys. Chem. B., 106, 1267).

To increase the pressure of the ionic liquid or electrolyte solution in one of the compartments, the increase in fluid pressure due to the combination of forward flow of ions and optionally solvent across the separator and the changes in apparent molar volume for the redox reaction needs to be greater than the decrease in pressure due to back flow of solvent (and due to the decrease in pressure due to flow out any outlets or due to compartment expansion). The rate of backflow of solvent through the membrane depends upon its hydraulic permeability. Therefore, the hydraulic permeability of the membrane is another factor in membrane selection when pressurization of the ionic liquid or electrolyte solution is desired.

For pressurization of the electrolyte solution or ionic liquid in a rigid compartment, the energy conversion efficiency can be estimated as $$\text{energy conversion efficiency} = (V\Delta P)/IEt \quad \text{Equation 1}$$

where V is the compartment volume, $\Delta P$ is the increase in pressure, I is the current, E is the potential and t is the time (if it can be assumed that there is no liquid flow out from the pressurized compartment). Mechanisms contributing to loss of efficiency include mechanical membrane deformation, backflow through the membrane, and Joule heating effects. In an embodiment, the efficiency is greater than about 2%.

A support structure may be used to hold the separator and optionally reduce its deflection under pressure. The support structure is configured to allow contact between the electrolyte solution(s) or ionic liquid(s) and the separator. In an embodiment, the support structure has an array of holes, the holes being approximately ⅛" (3.2 mm) in diameter. The support structure may be made of any suitable material known to those skilled in the art which is chemically compatible with the ionic solution(s) or liquid(s).

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

EXAMPLE 1

Pressurization in an Electrochemical Cell with DMF Electrolyte Solutions

Experiments were performed in a two-compartment cell fabricated from polyetheretherketone (PEEK) with one side open to the atmosphere and the other closed and fitted with a pressure transducer (Micron Instruments, Model MP40A-300A). The membrane was a cation selective ionomer membrane composed of a perfluorosulfonic acid/PTFE copolymer (Nafion® 117, DuPont) of 180 microns thick and operated with an exposed area of 0.55 cm². The membrane was suspended between two ethylene propylene o-rings with a perforated membrane holder (PEEK) and nylon mesh filter (100 micron diameter pore size, Millipore #NY1H) providing mechanical support. Electrical connection was made with platinum mesh electrodes in each equal-volume compartment ($V_{right}=V_{left}=1.25$ mL). The pumping cell was operated in constant-current mode using a galvanostat (Princeton Applied Research, Model 273A) with computer data acquisition (10 Hz acquisition rate: National Instruments DAQ-card-6036E, with LabView software).

During pump operation, each compartment was filled with identical solutions of tetrapropylammonium iodide (0.5 M; Sigma-Aldrich, >98+%)) and iodine (0.25 M, Sigma-Aldrich, 99.8%) in dimethylformamide (Sigma-Aldrich). All chemicals were used without further purification. Initial conditions ensure no concentration difference between compartments, effectively eliminating direct osmotic flow contributions. Membranes were conditioned in this solution for 24 to 48 hours and placed directly into the cell. Operating in the constant-current mode, a current applied to the cell of 20 mA resulted in a voltage across the cell of about 5 V.

Figure 3:
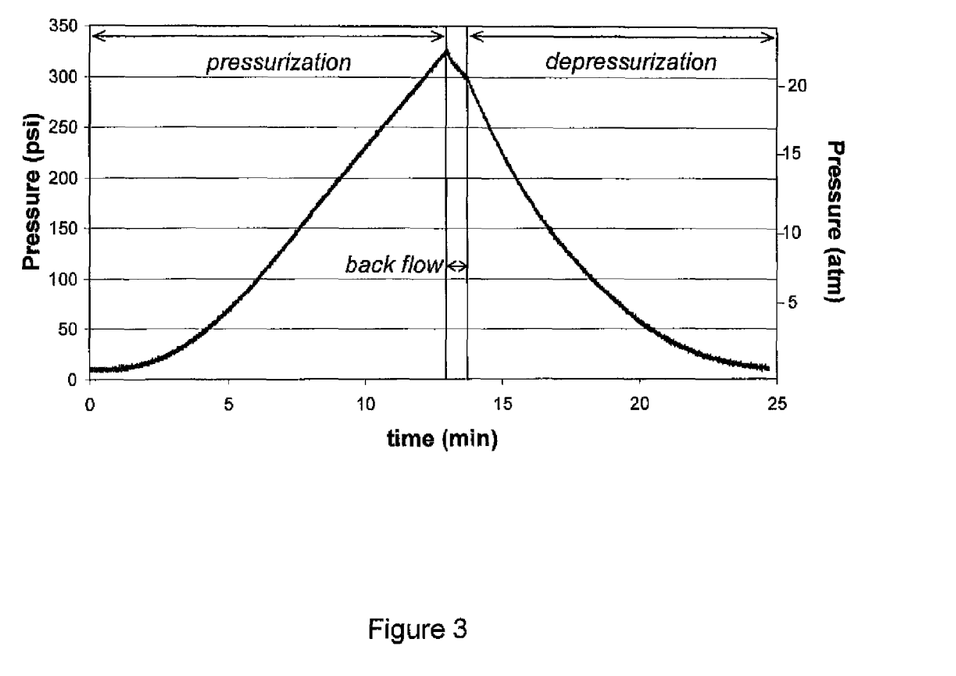
FIG. 3: Fluid pressure as a function of time for an electrochemical cell containing electrolyte solutions of tetrapropylammonium iodide and iodine in dimethylformamide (DMF).

In forward pumping mode, reduction in the right chamber leads to cation transport into the right compartment. An increase in pressure is observed, resulting from cation and solvent flow through the membrane. FIG. 3 shows pressure as a function of time for this system. After a short induction time, linear pressure behavior is observed with a net forward rate in the presence of backflow of 2.2 atm/min or 2.0 atm/C. With only backflow (at i=0) a reverse rate of 2.3 atm/min is measured at 22 atm, indicating an ion-driven forward rate of about twice the pressure-driven back rate (at $P_{right}=23$ atm, $P_{left}=1$ atm). Reversible pressure cycling behavior has also been demonstrated.

The energy efficiency for the full pressurization range in FIG. 3, as calculated from equation 1, is 3.5%. For the pre-pressurized range above 3.5 min, the energy efficiency is 4.1%.

EXAMPLE 2

Pressurization in an Electrochemical Cell with Aqueous Electrolyte Solutions

An electrochemical cell similar to that in Example 1 was used. During pump operation, each compartment was filled with identical solutions of LiI, NaI, or KI (Sigma-Aldrich)) and iodine (0.25 M, Sigma-Aldrich, 99.8%) in deionized ultra-high purity water. All chemicals were used without further purification. Initial conditions ensure no concentration difference between compartments, effectively eliminating direct osmotic flow contributions. Membranes were conditioned in this solution for 24 to 48 hours and placed directly into the cell. Operating in the constant-current mode, a current applied to the cell of 20 mA resulted in a voltage across the membrane of about 1 V.

Figure 4:
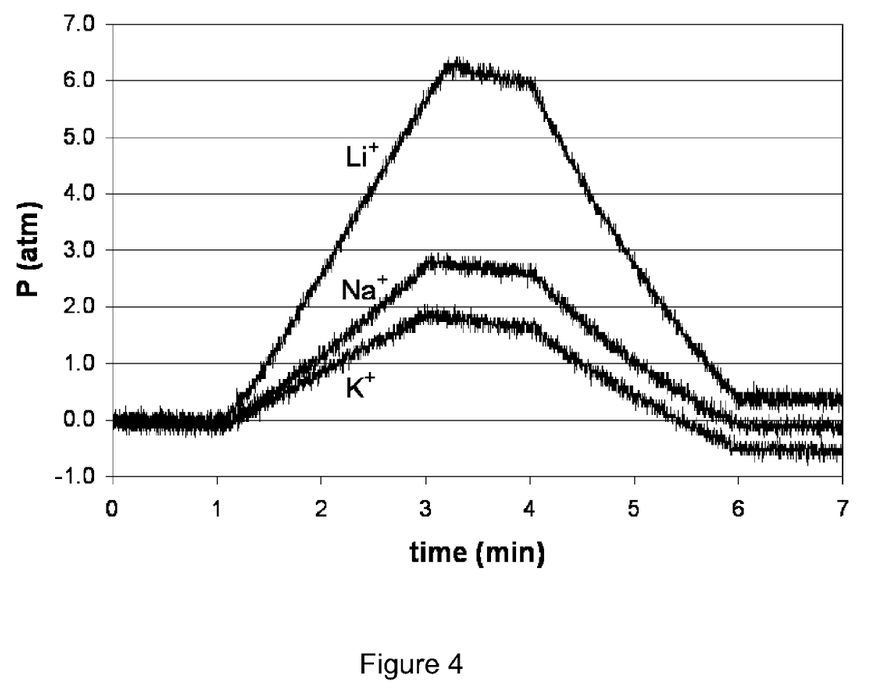
FIG. 4 shows the change in fluid pressure with time for electrochemical cells containing three different electrolyte solutions (LiI/$I_2$, NaI/$I_2$, or KI/$I_2$, all in deionized water).

FIG. 4 shows a plot of the change in pressure with time for the three different electrolyte solutions (LiI/$I_2$, NaI/$I_2$, or KI/$I_2$). The rate of change in pressure with time depended on the iodide salt used. The applied current for this figure is as follows: during the first minute the current was zero, increased to +40 mA at 1 minute, set to zero at minute 3, to −40 mA at minute 4 and back to zero at minute 6.

EXAMPLE 3

Liquid Flow in an Electrochemical Cell with DMF Solutions

Figure 5:
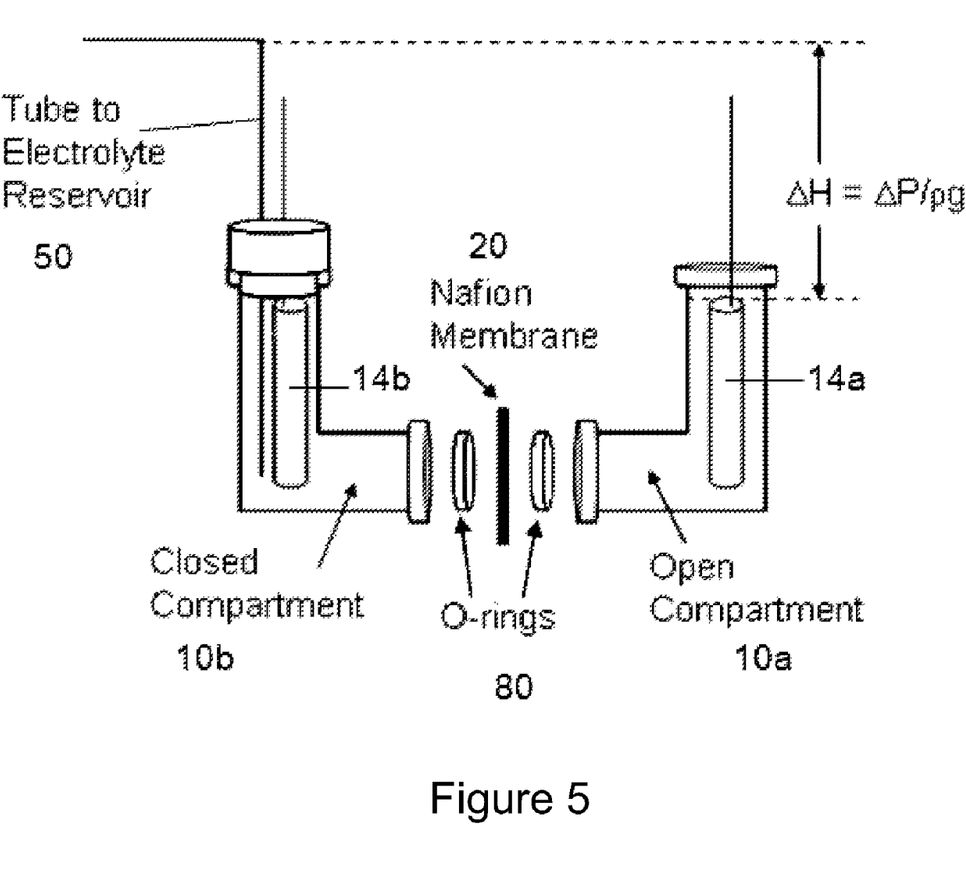
FIG. 5: Schematic of the electrochemical cell used in the volume change pumping experiment described in Example 3.

Volume changes resulting from electrolysis of DMF solutions are reported by Norman et al. (2004, J. Electrochem. Soc., 151(12), E364-D371). A glass electrochemical cell was constructed from two identical L-shaped tubes that were water-jacketed to maintain constant temperatures. The two sides of the cell were assembled with a Nafion® membrane sandwiched between two sulfur-cured ethylene propylene (EPDM) O-rings (80 in FIG. 5). One side of the cell was capped and the other side was open. FIG. 5 shows a schematic of the electrochemical cell. The membrane area that was exposed to solution was 5.07 $cm^2$.

Initial conditions ensure no concentration difference between compartments (approximately 60 mL each), effectively eliminating direct osmotic contributions to transport. The solutions were magnetically stirred and large platinum mesh electrodes (approximately 95 $cm^2$) were inserted in each compartment. A Princeton Applied Research model 173 galvanostat was used to control current.

In order to monitor volume changes in the closed compartment, a small Teflon tube (i.d. 1.06 mm) was connected from the closed compartment of the cell to a solution reservoir on a top loading balance above the cell. Volume changes in the closed compartment were determined by the mass change in the solution reservoir (and the electrolyte solution density, which was 0.99 g/$cm^3$).

The solutions were of a mixture of 0.5 M tetrabutylammonium iodide (TBAI) from Aldrich at 99% purity or tetrapropylammonium iodide (TPAI) from Aldrich at 98% purity and 0.1 M $I_2$ from Aldrich in ACS grade DMF. The same electrolyte solution was added to both compartments of the cell.

Figure 6:
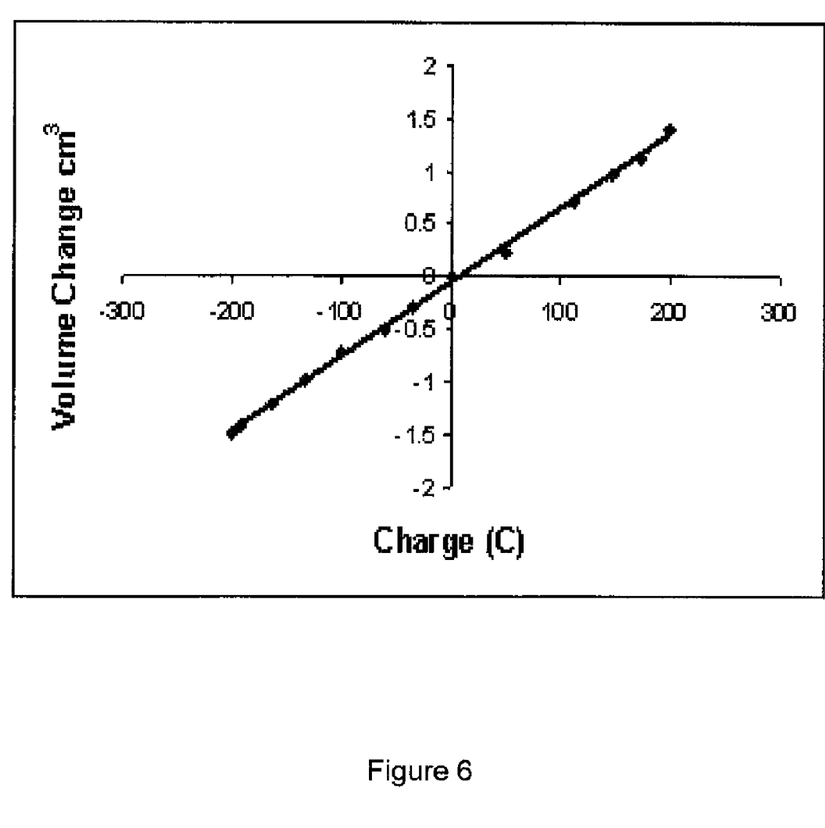
FIG. 6: Volume change as a function of charge for electrolysis of 0.5 M TBAI/0.1 M $I_2$/DMF solutions.

The positive charge values in FIG. 6 depict how the volume of electrolyte solution in the closed compartment of the cell varied as $I_3^-$ was reduced to $I^-$ and $TBA^+$ ions migrated across the Nafion® membrane, as a function of the charge passed during the electrolysis. The experimental conditions were as follows: Nafion® 117 membrane, 0.5 M TBAI/0.1 M $I_2$/DMF, 100 mA, $\Delta h=12$ cm. The volume-to-charge ratio ($cm^3$/C) was calculated from the slope of a regression line, and a volumetric pumping rate ($cm^3$/s) was calculated from the cell current. For currents in the range 50-125 mA, the pumping rate was in the range from roughly 20 to 50 µL/min.

When the polarity of the electrodes was reversed (negative charge values in FIG. 6), $I^-$ was oxidized to $I_3^-$ in the closed compartment and $TBA^+$ ions and solvent flowed through the membrane into the open compartment, resulting in negative volume changes. The electrochemical pumping could be repeated for many cycles.

EXAMPLE 4

Liquid Flow in an Electrochemical Cell with Aqueous Solutions

An acrylic electrochemical cell was constructed from two identical cylindrical tubes that contained a membrane holder between the two compartments (Norman et al., 2005, Anal. Chem., 77(10), 6374-6380). All fittings and valves in this cell design were nonmetallic and composed of either PEEK or nylon.

The electrolyte solutions used were one of four iodide salts (LiI, NaI, KI, TrisHI) at a concentration of 1.0 M. The solutions also contained iodine (0.1 M) which reacts with excess iodide ion to form triiodide ion. Each compartment of the cell contained about 20 mL of solution.

These electrolyte solutions undergo electrolysis, which interconverts the iodide and triiodide in the compartments of the cell and drives cations across the Nafion® membrane to maintain electroneutrality. Electrolysis occurred at porous reticulated vitreous carbon electrodes (Electrolytica, Inc., 30 pores per inch; 97% void space) in each compartment; these electrodes filled about 90% of the interior volume of the cell. Glassy carbon rods inserted in the side of the cell provided the electrode connection through pressure contact. A Princeton Applied Research Model 173 Galvanostat was used to control current.

A series of Nafion® membranes were obtained from the DuPont Company. These membranes were characterized previously by Manley et al. (*Chem. Mater.* 1996, 8, 2595-2600). Nafion® N002 (EW 1300, dry thickness 125 microns) and Nafion® N004 (EW 1500, dry thickness 125 microns) were examined for solvent uptake as described above and compared with Nafion® 117 (EW 1100, dry thickness 175 µm) membranes in electrolysis experiments.

In order to monitor volume changes in the compartments, a syringe barrel was connected to the top of each compartment of the cell through a Luer-loc™ fitting (Becton, Dickinson and Company). The barrels used were 50, 100 or 500 µL depending on the electrolyte being investigated and the total charge passed during electrolysis. Most electrolysis experiments were conducted for a total charge of 100 C in each direction at constant currents ranging between 25-75 mA. This corresponded to current densities based on exposed membrane area of 10-30 mA/cm$^2$. The liquid volume level in each syringe and the corresponding amount of charge passed was recorded periodically. The measured flow rates were reproducible to 10% relative standard deviation or less.

Most of the electrochemically driven flow rates reported below were obtained by recording fluid levels in syringe barrels attached to the cell compartments. In order to demonstrate that this type of cell could be used for flow injection analysis or particle counting applications, a few experiments were performed that used the ports where the syringe barrels usually reside to force flow through a 0.53 mm ID capillary tube (100 cm in length) instead. Flow rate was determined by weighing the solution that exited the tube and its density. Experiments using the TrisHI/I$_2$ electrolyte at 75 mA produced flow rates that were within 10 rel % of the values determined by volume. For the 0.53 mm ID tubing, the linear velocity of solution in the tube was approx. 1 mm/s.

The volume-to-charge ratio (µL/C or mL/mol of electrons) for each electrolyte was calculated from the slope of the regression line and a volumetric pumping rate (µL/s) was calculated from the cell current (Table 1). For the cations examined the change in membrane material produced a relatively small change in flow rate, i.e. flow rate decreased by 20-50% as the equivalent weight of the membrane increased from 1100 to 1500 g/mol sites. The volume-to-charge ratios in Table 1 did not depend upon the current density over the range examined (10-30 mA/cm$^2$ of membrane), i.e. the fluid pumping was directly proportional to the cell current. In order to convert the data into more traditional pumping units, Table 1 also contains volume/time flow rates for this range of current densities and the electrolyte/membrane systems examined. Pumping rates ranging from less than 1 µL/min to ca. 14 µL/min were attainable for these operating conditions.

At any time during an electrolysis experiment, reversing the polarity of the electrodes caused the flow of electrolyte to reverse directions. Current/flow reversal was repeated many times to insure repeatability of the pumping rates.

TABLE 1

Comparison of electrochemical pumping rates for different electrolyte cations and Nafion ® membrane materials.

| Membrane | Volume pumped (µL/C) | Volume pumped (cm$^3$/mol e-) | Flow Rate Range (µL/min) |
|---|---|---|---|
| N117 | | | |
| Li$^+$ | 2.3 | 220 | 3.4-10. |
| Na$^+$ | 1.5 | 150 | 2.3-7.0 |
| K$^+$ | 1.0 | 93 | 1.4-4.3 |
| TrisH$^+$ | 3.1 | 3.0 × 10$^2$ | 4.6-14 |
| N002 | | | |
| Li$^+$ | 1.8 | 170 | 2.7-8.0 |
| Na$^+$ | 1.2 | 110 | 1.8-5.3 |
| K$^+$ | 0.6 | 62 | 1.0-2.9 |
| TrisH$^+$ | 2.6 | 250 | 3.9-12 |
| N004 | | | |
| Li$^+$ | 1.5 | 140 | 2.2-6.7 |
| Na$^+$ | 1.0 | 96 | 1.5-4.5 |
| K$^+$ | 0.5 | 48 | 0.75-2.2 |
| TrisH$^+$ | 2.4 | 230 | 3.6-11 |

Flow rate ranges assume a range of current densities from 10-30 mA/cm$^2$ of membrane area. The measured flow rates were reproducible to 10% relative standard deviation or less.

We claim:

1. An electrochemical pump comprising an electrochemical cell, wherein the electrochemical cell comprises:
   a) a first compartment comprising a first electrode and a first electrolyte solution, the first electrolyte solution comprising a first redox couple different in composition from the first electrode and which participates in a first electrode reaction and a first group of ions different from the first redox couple species, wherein neither of the species of the first redox couple is a gas;
   b) a second compartment comprising a second electrode and a second electrolyte solution, the second electrolyte solution comprising a second redox couple different in composition from the second electrode and which participates in a second electrode reaction and a second set of ions different from the second redox couple species, wherein neither of the species of the second redox couple is a gas; and
   c) an ionically conducting separator comprising an ion exchange membrane separating the first and second compartment, the separator being in fluid communication with the first and second electrolyte solution, wherein the separator allows transport of at least some species of the first and second groups of ions wherein the separator allows transport of at least some species of the first and second groups of ions from the first compartment to the second compartment in response to a first potential, and from the second compartment to the first compartment in response to a second potential.

2. The electrochemical pump of claim 1, wherein the second potential is opposite in polarity to the first potential.

3. The electrochemical pump of claim 1, wherein the first and second electrolyte solutions further comprise an ionic liquid.

4. The electrochemical pump of claim 1, wherein the first and second electrolyte solutions further comprise an electrolyte solvent.

5. The electrochemical pump of claim 4, wherein the electrolyte solvent is operable to solvate the first and second redox couple species.

6. The electrochemical pump of claim 4, wherein concentration of at least one of the first and second redox couple species in the solvent is greater than about 0.1 mol/L.

7. The electrochemical pump of claim 4, wherein the electrolyte solvent is non-aqueous.

8. The electrochemical pump of claim 4, wherein the electrolyte solvent is aqueous.

9. The electrochemical pump of claim 4, wherein the electrolyte solvent is selected from the group consisting of dimethylformamide, an aqueous organic ether mixture, aqueous acetonitrile, and task-specific ionic liquids for which the redox couple is part of the ionic liquid.

10. The electrochemical pump of claim 1, wherein the transport of at least some species of the first and second groups of ions occurs at a flow rate of at least 1 µL per minute.

11. The electrochemical pump of claim 1, wherein the transport of at least some species of the first and second groups of ions occurs at a flow rate of less than 1 µL per minute.

12. The electrochemical pump of claim 1, further comprising a source of electric current connected to the first and second electrode configured to cause transport of the at least some species of the first and second groups of ions through the separator.

13. The electrochemical pump of claim 1, further comprising a potential across the electrochemical cell.

14. The electrochemical pump of claim 13, wherein a current density in the electrochemical cell resulting from the potential is in the range of about 2 mA/cm$^2$ to about 100 mA/cm$^2$.

15. The electrochemical pump of claim 13, wherein the potential is less than about 10 V.

16. The electrochemical pump of claim 13, wherein the potential is less than about 1 V.

17. The electrochemical pump of claim 13, wherein a current across the electrochemical cell resulting from the potential is less than a mass-transport limited current associated with one of the first and second redox couples.

18. The electrochemical pump of claim 1, wherein the pump is configured so that when electric current is passed between the first and second electrodes a pressure of greater than 1 atmosphere can be obtained in at least one of the first and second compartments.

19. The electrochemical pump of claim 1, wherein the pump is configured so that when electric current is passed between the first and second electrodes a pressure of between about 1 atmosphere and about 10 atmospheres can be obtained in at least one of the first and second compartments.

20. The electrochemical pump of claim 1, wherein the pump is configured so that when electric current is passed between the first and second electrodes a pressure of greater than 20 atmospheres can be obtained in at least one of the first and second compartments.

21. The electrochemical pump of claim 1, further comprising a flexible diaphragm in communication with at least one of the first and second compartments and a flow channel containing a fluid in contact with the flexible diaphragm.

22. The electrochemical apparatus of claim 21, wherein the ionically conducting separator is an ion exchange membrane.

23. The electrochemical apparatus of claim 21, wherein the one of the first and second compartments in communication with the flexible diaphragm is configured so that flow of electrolyte solution into or out of such compartment can occur only through the ionically conducting separator.

24. The electrochemical apparatus of claim 21, wherein the separator allows transport of at least some species of the first and second groups of ions from the first compartment to the second compartment in response to a first potential, and from the second compartment to the first compartment in response to a second potential.

25. The electrochemical apparatus of claim 24, wherein the second potential is opposite in polarity to the first potential.

26. The electrochemical apparatus of claim 21, wherein the first and second electrolyte solutions further comprise an ionic liquid.

27. The electrochemical apparatus of claim 21, wherein the first and second electrolyte solutions further comprise an electrolyte solvent.

28. The electrochemical apparatus of claim 27, wherein the electrolyte solvent is operable to solvate the first and second redox couple species.

29. The electrochemical apparatus of claim 27, wherein concentration of at least one of the first and second redox couple species in the solvent is greater than about 0.1 mol/L.

30. The electrochemical apparatus of claim 27, wherein the electrolyte solvent is non-aqueous.

31. The electrochemical apparatus of claim 27, wherein the electrolyte solvent is aqueous.

32. The electrochemical apparatus of claim 27, wherein the electrolyte solvent is selected from the group consisting of dimethylformamide, an aqueous organic ether mixture, aqueous acetonitrile, and task-specific ionic liquids for which the redox couple is part of the ionic liquid.

33. The electrochemical apparatus of claim 21, wherein the transport of at least some species of the first and second groups of ions occurs at a flow rate of at least 1 µL per minute.

34. The electrochemical apparatus of claim 21, wherein the transport of at least some species of the first and second groups of ions occurs at a flow rate of less than 1 µL per minute.

35. The electrochemical apparatus of claim 21, further comprising a source of electric current connected to the first and second electrode configured to cause transport of the at least some species of the first and second groups of ions through the separator.

36. The electrochemical apparatus of claim 21, further comprising a potential across the electrochemical cell.

37. The electrochemical apparatus of claim 36, wherein a current density in the electrochemical cell resulting from the potential is in the range of about 2 mA/cm$^2$ to about 100 mA/cm$^2$.

38. The electrochemical apparatus of claim 36, wherein the potential is less than about 10 V.

39. The electrochemical apparatus of claim 36, wherein the potential is less than about 1 V.

40. The electrochemical apparatus of claim 36, wherein a current across the electrochemical cell resulting from the potential is less than a mass-transport limited current associated with one of the first and second redox couples.

41. The electrochemical apparatus of claim 21, further comprising a hydraulic force transmission element located within the flow channel wherein movement of the hydraulic force transmission element causes flow of the fluid in the flow channel.

42. The electrochemical apparatus of claim 41, wherein the hydraulic force transmission element is selected from the group consisting of a gas bubble, a slug of a second liquid, and a solid.

* * * * *